3,411,881
PREPARATION OF SOLUTIONS OF HYDROXYL-AMINE AND APPLICATION THEREOF

Willem Jacob van der Burg, Oss, Netherlands, assignor to Organon Inc., West Orange, N.J., a corporation of New Jersey
No Drawing. Filed Feb. 11, 1965, Ser. No. 431,993
Claims priority, application Netherlands, Mar. 6, 1964, 6402255
2 Claims. (Cl. 23—190)

ABSTRACT OF THE DISCLOSURE

An anhydrous alcoholic solution of hydroxylamine is prepared by reacting a solution of a hydroxylamine salt in an anhydrous alcohol with lithium alcoholate, at a temperature below 20° C., preferably between 0° and 5° C. The hydroxylamine solution is useful for the preparation of an hydroxamic acid from an amino acid ester.

---

The invention relates to the preparation of alcoholic solutions of hydroxylamine and the application of said solutions for the preparation of hydroxamic acids.

Hydroxylamine is a basically reacting substance miscible in all ratios with water, dissolving readily in methanol and ethanol. The compound is sensitive to oxygen and decomposes very easily when heated. This amine is used as reagent in various conversions, for instance in the preparation of oximes and hydroxamic acids. It is often used in the form of a salt, for instance a hydrohalogenic acid salt, from which the free base can be prepared by conversion with, for example, sodium ethanolate in anhydrous ethanol, if one wants to obtain an anhydrous solution. In this process the corresponding sodium salt separates, which salt is removed from the solution of the hydroxylamine by filtration, see for example J. Org. Chem. 24, 1499 (1959).

To obtain high yields in the conversions in which hydroxylamine is used as reagent, for instance, in the preparations to hydroxamic acids, it is often desirable that the concentration of the solution of hydroxylamine which is taken as starting material, be as high as possible. The concentration cannot be raised by evaporation on account of the instability and volatility of the hydroxylamine. Owing to the slight solubility of the alkali metal salts formed in the liberation of the hydroxylamine in a known manner, it is not possible to prepare highly concentrated solutions without removing the separated salt by filtration, which means an additional process, causing loss of hydroxylamine.

Surprisingly a process has been found now for the preparation of an anhydrous alcoholic solution of hydroxylamine from a solution of its salt in anhydrous alcohol by conversion with an alkali alcoholate, characterized in that lithium alcoholate is used.

This method has the advantage that the concentration of the hydroxylamine solution may be considerably higher than that prepared by the known method, while moreover the formed lithium salt does not separate, but remains in solution, so that no loss occurs by filtration, which has to be performed at a low temperature. In the preparation of an anhydrous lower aliphatic alcohol, such as methanol or ethanol, is preferably taken as starting material. The required amount of lithium is dissolved in it to form the lithium alcoholate, whereupon a salt of the hydroxylamine, for example the hydrochloride, is added while cooling. After some time all the salt has dissolved and has been converted into the free hydroxylamine. It is to be preferred to perform this conversion at a temperature below 20° C. to prevent decomposition, but preferably between 0° and 5° C.

Further it has been found that the thus prepared solutions of hydroxylamine are pre-eminently suitable for the preparation of hydroxamic acids from amino carboxylic esters.

It was known from J. Org. Chem. 11, 207 (1946) that hydroxamic acids can be prepared by the subsequent addition of a solution of hydroxylamine and sodium ethanolate, both in absolute ethanol, to a solution of the ester to be converted in the same solvent. The solution of the used hydroxylamine is prepared by dissolving the hydrochloride thereof in absolute ethanol and by adding dropwise, while cooling, a solution of sodium ethanolate, after which the precipitated sodium chloride is filtered. By the action of the hydroxylamine solution on the ester the sodium salt is formed of hydroxamic acid, which separates from the reaction mixture and is isolated from it. After solution of this salt in water and acidifying the solution the free hydroxamic acid is obtained.

It has been found, however, that although yields are often high when starting from aromatic carboxylic esters, yields of hydroxamic acids can only be obtained seldom exceeding 60% by the known method when starting from aliphatic esters, see for example G. F. Endres and J. Epstein in J. Org. Chem. 24, 1497 (1959). This reaction cannot be accelerated in a simple manner, as the hydroxylamine easily decomposes by heating. Application of higher concentrations of hydroxylamine prepared with sodium or potassium alcoholate was not very well possible either.

The process according to the invention has the following advantages:

Firstly the reaction period is shortened by application of the present, more concentrated solutions of hydroxylamine; secondly the lithium salts present in the hydroxylamine solution have a salting out activity on the hydroxamic acid, which is of great advantage as in a crystalline form these acids are mostly more stable than in solution; thirdly the said lithium salts can easily be removed from the formed hydroxamic acids by washing with these liquids, owing to their great solubility in alcohol and ether. As a result it is possible to obtain much higher yields of hydroxamic acid now than with the known preparation method.

It is to be preferred to use a salt of the amino acid ester as starting product, for example a hydrohalogenic acid salt, and to convert it into the free amino acid ester in anhydrous alcohol with lithium alcoholate. The lithium salt formed during this process remains in solution and has a salting out activity on the hydroxamic acid. Next the concentrated solution of hydroxylamine is added to the thus prepared solution and the mixture is left to stand for a few days at low temperature. A crystal cake is formed, which is filtered by suction and washed with successively the used alcohol and ether. After separation of the crystal cake from the mother liquor another small amount of hydroxamic acid can be isolated from it after a few days' standing.

As examples of amino acid esters that may thus be converted into their hydroxamic acid, are mentioned the lower alkyl esters, phenyl esters and especially active esters of α-amino acids, for example glycine, alanine, valine, leucine, serine, lysine, phenylalanine, histidine, tryptophane and proline.

It has been found that good results are obtained in the present process when equimolecular amounts of the reaction components are used. Moreover it has been found that by application of an excess of hydroxylamine optimal results may be obtained, especially with an excess of about 50%. Further the process is preferably performed at a temperature at which neither the hydroxylamine nor the hydroxamic acid decompose appreciably, i.e. below 20° C., but best at 0–5° C.

A special application of this method is found in the preparation of the rather unstable α-amino-γ-bromo-butyrohydroxamic acid from the corresponding ester, which could not be obtained in good yield by the known method, but can be recovered in a yield of more than 70% by the process according to the invention.

Hydroxamic acids have proved to be of importance on account of their property of rendering the poisonous gas, isopropoxy-methyl-phosphoryl-fluoride, which affects the nervous system, inactive, see for example J. Org. Chem. 24, 1497 (1959). Further the 1-hydroxy-3-amino-pyrrolidon-2, acting on the central nervous system, can be prepared from the α-amino-γ-bromo-butyro-hydroxamic acid by cyclisation, see for example Netherlands Patent application No. 275,964.

Hereafter follow a few examples as a further illustration of the invention.

Example I

*Preparation of hydroxylamine solution*

In 250 ml. of dry methanol are dissolved 7 g. of lithium. Next the solution of lithium methanolate obtained is cooled down to 0° C. whereupon 70 g. of finely powdered $H_2NOH.HCl$ are added. After stirring for some time all the substance has dissolved and has been converted into the free hydroxylamine.

Example II

*Preparation of an α-amino-γ-bromo-butyro hydroxamic acid*

(a) To a solution of 7 g. of lithium in 250 ml. of dry methanol are added 232.5 g. of α-amino-γ-bromo-butyric acid methyl ester.HCl. After stirring for some time the salt has completely dissolved and has been converted into the free amino acid ester. Next the solution of hydroxylamine is added to it and the reaction mixture is left to stand for a few days at 0–5° C. After four days the crystal cake formed is sucked off, crushed and washed 3 times, each time with 20 ml. of cold methanol, and next with a little ether. Finally 138 g. (70% of the theory) of hydroxamic acid are obtained; melting point 117–119° C. After a few days standing at 0–5° C. a further 4% of final product is isolated from the mother liquor of the crystal cake.

(b) It was found that under the reaction conditions of (a) in which equimolecular amounts of ester and hydroxylamine were used, a complete conversion is reached after 8 days standing. The same conversions were performed with an excess of 50% $H_2NOH$. It was found that this time a complete conversion had taken place in 5 days.

Example III

*Preparation of alanine hydroxamic acid*

Ten g. of lithium are dissolved in 350 ml. of dry methanol. The solution of lithium methanolate obtained is cooled down to 2° C., after which 198.7 g. of alanine methyl ester.HCl are added. Stir for a short time till the salt has entirely dissolved and has been converted into alanine methyl ester. Next a solution of hydroxylamine is added, obtained by dissolving 10 g. of lithium in 350 ml. of dry methanol and adding to this solution 100 g. of $H_2NOH.HCl$. The reaction mixture is left to stand for 5 days at a temperature of 2° C. Next the crystal cake formed is sucked off, crushed and washed 3 times, each time with 24 ml. of cold methanol and next with a little ether to obtain 117.3 g. of alanine hydroxamic acid, i.e. 79% of the theory. Melting point 162° C.

Example IV

In an analogous manner the hydroxamic acids of valine and leucine were prepared starting from the HCl salts of their methyl esters. The corresponding hydroxamic acids were obtained in a yield of 78 and 80% respectively.

Example V

In an analogous manner the hydroxamic acid of tryptophan was prepared from the HCl salt of its ethyl ester. After a reaction time of 8 days the hydroxamic acid was obtained in a yield of 77%.

I claim:
1. Process for the preparation of an anhydrous alcoholic solution of hydroxylamine from a solution of its salt in an anhydrous alcohol which comprises reacting said solution with lithium alcoholate.
2. Process according to claim 1 in which the reaction is performed below 20° C., preferably between 0 and 5° C.

References Cited

UNITED STATES PATENTS

| | | | |
|---|---|---|---|
| 3,145,082 | 8/1964 | Rausch et al. | 23—190 |
| 3,148,940 | 9/1964 | Groves | 23—190 |

OSCAR R. VERTIZ, *Primary Examiner.*

H. S. MILLER, *Assistant Examiner.*